United States Patent
Iwaasa et al.

(10) Patent No.: US 7,406,700 B2
(45) Date of Patent: Jul. 29, 2008

(54) DISK PLAYER FOR REDUCING FOCUS SERVO CHARACTERISTIC

(75) Inventors: Hiroaki Iwaasa, Osaka (JP); Mio Koga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 488 days.

(21) Appl. No.: 11/029,488

(22) Filed: Jan. 6, 2005

(65) Prior Publication Data

US 2005/0166216 A1 Jul. 28, 2005

(30) Foreign Application Priority Data

Jan. 7, 2004 (JP) .......................... P.2004-001619

(51) Int. Cl.
G11B 7/08 (2006.01)
G11B 33/08 (2006.01)

(52) U.S. Cl. .................. 720/651; 720/679; 720/688

(58) Field of Classification Search ................. 720/698, 720/651, 692, 679, 688, 611
See application file for complete search history.

(56) References Cited

U.S. PATENT DOCUMENTS

| | | | |
|---|---|---|---|
| 5,311,497 A | | 5/1994 | Takizawa et al. ............ 720/668 |
| 5,615,204 A | | 3/1997 | Watanabe et al. ........... 720/679 |
| 5,725,931 A | * | 3/1998 | Landin et al. ................ 428/134 |
| 6,178,155 B1 | * | 1/2001 | Ueda et al. ................... 720/692 |
| 6,392,976 B1 | * | 5/2002 | Lin ............................. 720/611 |
| 6,445,673 B2 | * | 9/2002 | Park ............................ 720/675 |
| 6,646,977 B2 | * | 11/2003 | Chen et al. .................. 720/692 |
| 6,826,768 B2 | * | 11/2004 | Wu et al. ..................... 720/651 |
| 2003/0133390 A1 | * | 7/2003 | Chuang et al. ............. 369/75.2 |
| 2003/0231575 A1 | * | 12/2003 | Hong et al. ................. 369/263 |

FOREIGN PATENT DOCUMENTS

| | | |
|---|---|---|
| JP | 56-127962 | 9/1981 |
| JP | 2-40174 | 2/1990 |
| JP | 5-94627 | 4/1993 |
| JP | 7-161151 | 6/1995 |
| JP | 8-102073 | 4/1996 |
| JP | A-9-293369 | 11/1997 |
| JP | 2000-149278 | 5/2000 |

* cited by examiner

*Primary Examiner*—Brian E Miller
(74) *Attorney, Agent, or Firm*—Morgan, Lewis & Bockius LLP

(57) ABSTRACT

A deck is formed integrally on a front side of a drive chassis. As the drive chassis is moved upward, a disk is mounted on a turntable. The disk is rotated at high speed by a spindle motor, and an optical pick up is reciprocatingly moved along a guide rail and a guide shaft, and a lens holder is moved in focusing directions and tracking directions. Laser light is projected onto the disk through an objective lens so as to read information recorded on the disk. Vibration damping holes are respectively provided penetratingly in the deck substantially between a spindle motor fixing recessed groove of the deck and the guide rail and between the recessed groove and the guide shaft.

5 Claims, 7 Drawing Sheets

PRIOR ART

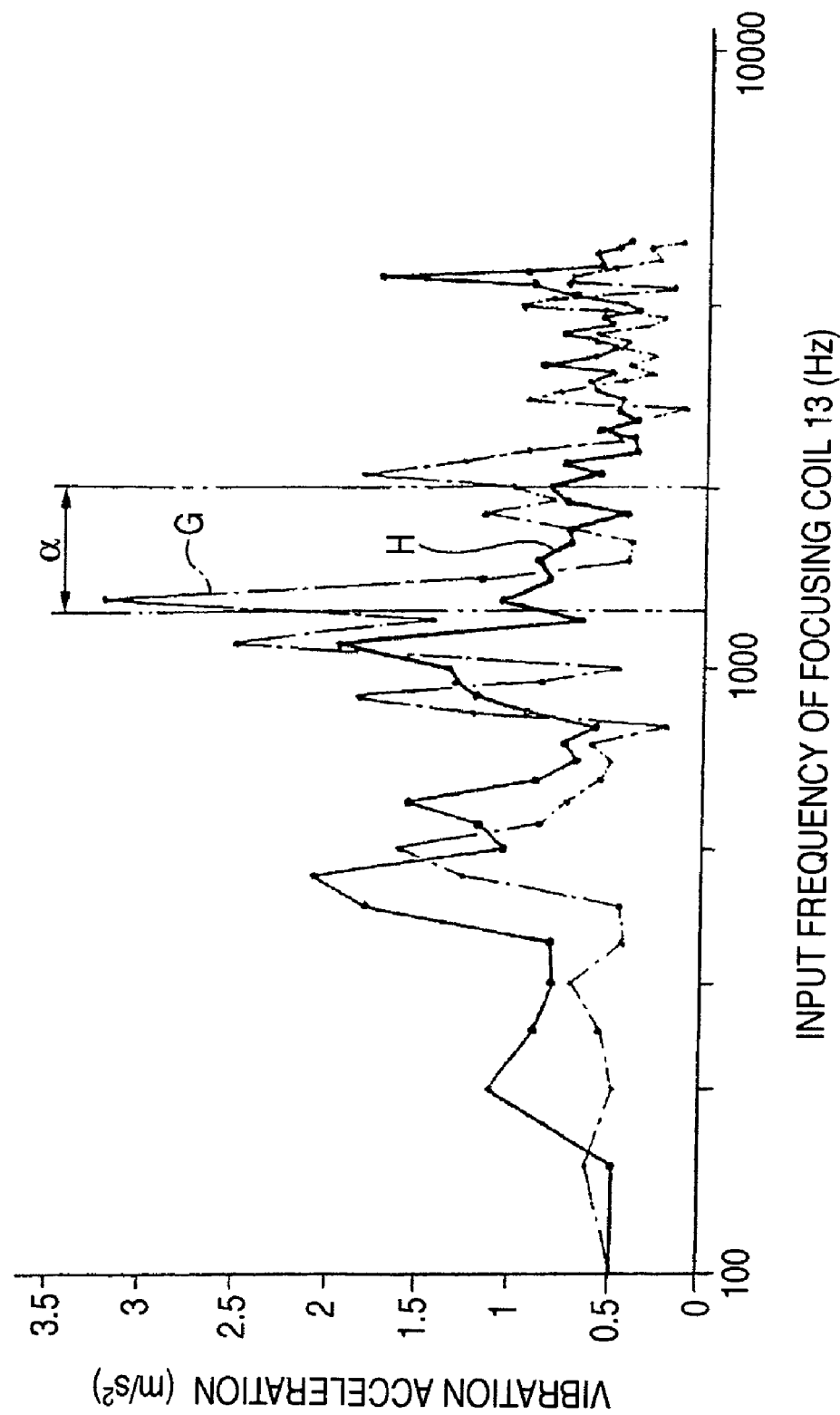

DISK PLAYER FOR REDUCING FOCUS SERVO CHARACTERISTIC

BACKGROUND OF THE INVENTION

1. Field of the Invention

The present invention relates to a disk player for effecting the reproduction, recording, or deleting of an optical disk or a magnetic disk (hereafter referred to as the disk) such as a DVD.

2. Description of the Related Art

Conventionally, as a technique concerning a disk player, one such as shown in a JP-A-9-293369 is known. A description will be given of one such example with reference to FIGS. 5 to 9. In this disk player, a synthetic resin-made drive chassis 2 is disposed in a housing 1 in such a manner as to be movable in upward and downward directions a and b by means of a pair of pivot shafts 2a respectively provided projectingly on rear portions of both side surfaces thereof. A camshaft 2b provided projectingly on a front surface of the drive chassis 2 is fitted in a cam hole 3a of a cam plate 3 which is movable in leftward and rightward directions c and d. A deck 2A is integrally formed on a front side of the drive chassis 2, while an accommodating recess 2B is formed on a side located rearwardly of the deck 2A of the drive chassis 2. One side edge of the accommodating recess 2B is formed as a guide rail 4 extending in backward and forward directions e and f from a rear end portion of the drive chassis 2 to the deck 2A. As a front end 5a of a guide shaft 5 is fitted in a fixing hole 6 of the deck 2A, and a rear end 5b of the guide shaft 5 is fixed to the rear end portion of the drive chassis 2 by means of a screw 7, the guide shaft 5 is disposed on the other side edge side of the accommodating recess 2B in parallel with the guide rail 4. It should be noted that although a multiplicity of holes are formed in the deck 2A, as required, the illustration of the holes is omitted to facilitate the explanation.

As shown in FIGS. 5 to 7, an optical pick up 9 made up of a synthetic resin-made base 9A and a pickup body 9B disposed on the base 9A is disposed in the accommodating recess 2B. The pickup body 9B includes an actuator base 10 screwed down onto the base 9A; a lens holder 12 having an objective lens OL and fitted in a supporting shaft 11 provided uprightly on a bottom plate of the actuator base 10; a focusing coil 13 and a tracking coil 14 installed on the lens holder 12; and a pair of permanent magnets 15 opposing each other with the lens holder 12 interposed therebetween. As the lens holder 12 is moved in focusing directions g and h by exciting the focusing coil 13 at a predetermined input frequency, and the tracking coil 14 is exited at a predetermined input frequency, the lens holder 12 is moved in tracking directions i and j.

As shown in FIGS. 5 to 8, a pair of outwardly expanding and inclined inner side surfaces 18a of an annular guide groove 18, which is formed in an outer peripheral surface of a guide roller 17 pivotally secured to one end portion of the base 9A, are engaged with the guide rail 4. At the same time, the guide shaft 5 is fitted in a bearing hole 19a of each of a front and rear pair of bearing portions integrally provided projectingly on the other end portion of the base 9A. A pinion 21 is threadedly engaged with a rack 20 connected to the other end portion of the base 9A. As the pinion 21 is rotated forwardly or reversely through a gear mechanism 23 by a feed motor 22, the optical pick up 9 is reciprocatingly moved in the backward and forward directions e and f along the guide rail 4 and the guide shaft 5 by means of the rack 20.

As shown in FIGS. 5 and 9, a recessed groove 25 communicating with the accommodating recess 2B is formed in the center of a rear portion of the deck 2A. A spindle motor 26 is fixed in the recessed groove 25, and a turntable 27 for mounting a disk D is secured on a rotating shaft 26a of the spindle motor 26.

To describe the operating procedure, as the cam plate 3 is slid in the rightward direction d (or the leftward direction c), the drive chassis 2 is moved in the upward directions a about the pivot shaft 2a by means of the cam hole 3a and the cam shaft 2b so as to be set in a horizontal state, the disk D is thereby mounted on the turntable 27 (FIG. 7). The disk D is rotated at high speed by the spindle motor 26, and the optical pick up 9 is reciprocatingly moved in the backward and forward directions e and f along the guide rail 4 and the guide shaft 5. The lens holder 12 is moved in the focusing directions g and h and the tracking directions i and j by exciting the focusing coil 13 and the tracking coil 14 at the predetermined input frequencies. Further, as laser light is projected onto the disk D through the objective lens OL, information recorded on the disk D is read.

With the above-described conventional construction, the one side edge of the accommodating recess 2B formed in the drive chassis 2 is used jointly as the guide rail 4 to attain a cost reduction, and there is an advantage in that as compared with a case where two guide shafts 5 are used, the number of parts is small, so that this arrangement is economical. However, a slight gap is likely to occur between the guide rail 4 and the annular guide groove 18 of the guide roller 17 engaging therewith. As a result of the occurrence of the gap, when the lens holder 12 is moved in the focusing directions g and h by exciting the focusing coil 13, the optical pick up 9 is vibrated in upward and downward directions k and m (see FIG. 6) about the guide shaft 5 owing to that movement. This vibration is transmitted from the guide rail 4 (and the guide shaft 5) to the turntable 27 through the deck 2A and the spindle motor 26, causing the disk D on the turntable 27 to vibrate infinitesimally.

As shown in FIG. 7, when the present inventor examined the infinitesimal vibration (vibration acceleration) of a central portion of the disk D by an acceleration pickup 29, the infinitesimal vibration was as shown at a phantom line G in FIG. 10. It was found that the disturbance of the focus servo characteristic was large particularly in a normal working range α (1,300 to 2,100 Hz) of the focusing coil 13.

In the above-described construction, since the disturbance of the focus servo characteristic is large, the focusing of the objective lens OL with respect to the disk D takes time, and the reading speed is therefore delayed.

SUMMARY OF THE INVENTION

In view of the above-described drawbacks of the conventional art, an object of the invention is to provide a disk player which is capable of reducing the disturbance of the focus servo characteristic.

To attain the above object, according to a first aspect of the invention, there is provided a disk player in which a synthetic resin-made drive chassis is disposed in a housing in such a manner as to be vertically movable, a deck is integrally formed on a front side of the drive chassis, an accommodating recess is formed in the drive chassis rearwardly of the deck, one side edge of the accommodating recess is formed as a guide rail extending from a rear end portion of the drive chassis toward the deck in backward and forward directions, both ends of a guide shaft disposed on another side edge side of the accommodating recess in parallel with the guide rail are fixed to the rear end portion of the drive chassis and the deck, an optical pick up including a synthetic resin-made base and a lens holder with an objective lens which is movable in a focusing direction and a tracking direction by fitting to a supporting shaft provided uprightly on the base is disposed in the accommodating recess, a pair of outwardly expanding and inclined inner side surfaces of an annular guide groove, which is formed in an outer peripheral surface of a guide roller pivotally secured to one end portion of the base, are engaged with the guide rail, the guide shaft is fitted in a bearing hole of a bearing portion integrally provided projectingly on another end portion of the base, a recessed groove communicating with the accommodating recess is formed in the deck, a spindle motor is fixed in the recessed groove, a turntable for mounting a disk is secured to a rotating shaft of the spindle motor, as the drive chassis is moved upward, a disk is mounted on the turntable, the disk is rotated at high speed by the spindle motor, the optical pick up is reciprocatingly moved along the guide rail and the guide shaft, the lens holder is moved in the focusing direction and the tracking direction, and laser light is projected onto the disk through the objective lens so as to read information recorded on the disk, characterized in that vibration damping holes are respectively provided penetratingly in the deck substantially between the spindle motor fixing recessed groove of the deck and the guide rail and between the recessed groove and the guide shaft, that the vibration damping hole on a guide rail side has the same width as the guide rail and is formed in such a manner as to extend from a front end of the guide rail in the forward direction, that the vibration damping hole on a guide shaft side is formed with substantially the same width as the vibration damping hole on the guide rail side and is formed in such a manner as to extend from a vicinity of a front end of the guide shaft in the forward direction, and that a reinforcing girder traversing a substantially central portion of the vibration damping hole on the guide shaft side is formed integrally with the deck.

According to a second aspect of the invention, there is provided a disk player in which a synthetic resin-made drive chassis is disposed in a housing in such a manner as to be vertically movable, a deck is integrally formed on a front side of the drive chassis, an accommodating recess is formed in the drive chassis rearwardly of the deck, one side edge of the accommodating recess is formed as a guide rail extending from a rear end portion of the drive chassis toward the deck in backward and forward directions, both ends of a guide shaft disposed on another side edge side of the accommodating recess in parallel with the guide rail are fixed to the rear end portion of the drive chassis and the deck, an optical pick up having a lens holder with an objective lens which is movable in a focusing direction and a tracking direction is movably engaged with the guide rail and the guide shaft, a spindle motor is fixed in a recessed groove formed in the deck, a turntable for mounting a disk is secured to a rotating shaft of the spindle motor, as the drive chassis is moved upward, a disk is mounted on the turntable, the disk is rotated at high speed by the spindle motor, the optical pick up is reciprocatingly moved along the guide rail and the guide shaft, the lens holder is moved in the focusing direction and the tracking direction, and laser light is projected onto the disk through the objective lens so as to read information recorded on the disk, characterized in that a vibration damping hole is provided penetratingly in the deck substantially between the spindle motor fixing recessed groove of the deck and the guide rail.

According to a third aspect of the invention, in the second aspect of the invention, the vibration damping hole on a guide rail side is formed with substantially the same width as the guide rail and is formed in such a manner as to extend from a front end of the guide rail in the forward direction.

According to a fourth aspect of the invention, in the second and the third aspect of the invention, the vibration damping hole is also penetratingly provided substantially between the spindle motor fixing recessed groove of the deck and the guide shaft.

According to a fifth aspect of the invention, in the fourth aspect of the invention, the vibration damping hole on the guide shaft side is formed with substantially the same width as the vibration damping hole on the guide rail side and is formed in such a manner as to extend from a vicinity of a front end of the guide shaft in the forward direction.

According to a sixth aspect of the invention, in the fifth aspect of the invention, a reinforcing girder traversing a substantially central portion of the vibration damping hole on the guide shaft side is formed integrally with the deck.

According to the first aspect of the invention, as the lens holder is moved in the focusing direction by exciting the focusing coil, the optical pick up is vibrated in the vertical direction about the guide shaft. Even if the vibration is transmitted from the guide rail and the guide shaft to the deck, since the vibration damping holes are respectively provided penetratingly in the deck substantially between the spindle motor fixing recessed groove of the deck and the guide rail and between the recessed groove and the guide shaft, the vibration which is transmitted to the disk through the spindle motor fixed to the deck and the turntable is virtually off and is substantially damped. Thus, the disturbance of the focus servo characteristic can be reduced in a normal working range of the focusing coil. As a result, it becomes possible to speedily effect the focusing of the objective lens with respect to the disk and substantially reduce the reading speed as compared with the conventional arrangement.

Here, in particular, since the vibration damping hole on the guide rail side has the same width as the guide rail and is formed in such a manner as to extend from the front end of the guide rail in the forward direction, a connecting portion between the guide rail and the deck can be made short. Hence, it becomes possible to substantially damp the vibration transmitted from the guide rail to the deck.

In addition, since the vibration damping hole on the guide shaft side is formed with substantially the same width as the vibration damping hole on the guide rail side and is formed in such a manner as to extend from the vicinity of the front end of the guide shaft in the forward direction, a connecting portion between the guide shaft and the deck can be made short. Hence, it also becomes possible to substantially damp the vibration transmitted from the guide shaft to the deck.

Furthermore, since the reinforcing girder traversing a substantially central portion of the vibration damping hole on the guide shaft side is formed integrally with the deck, it is possible to prevent the deck from becoming deflected due to the weight of the spindle motor and reliably fix the spindle motor to the deck.

According to the second aspect of the invention, as the lens holder is moved in the focusing direction by exciting the focusing coil, the optical pick up is vibrated in the vertical direction about the guide shaft. Even if the vibration is transmitted from the guide rail to the deck, since the vibration damping hole is provided penetratingly in the deck substantially between the spindle motor fixing recessed groove of the deck and the guide rail, the vibration which is transmitted to the disk through the spindle motor fixed to the deck and the turntable is virtually off and is substantially damped. Thus, the disturbance of the focus servo characteristic can be reduced in the normal working range of the focusing coil. As a result, it becomes possible to speedily effect the focusing of the objective lens with respect to the disk and substantially reduce the reading speed as compared with the conventional arrangement.

According to the third aspect of the invention, since the vibration damping hole on the guide rail side has the same width as the guide rail and is formed in such a manner as to extend from the front end of the guide rail in the forward direction, a connecting portion between the guide rail and the deck can be made short. Hence, it becomes possible to substantially damp the vibration transmitted from the guide rail to the deck.

According to the fourth aspect of the invention, since the vibration damping hole is also penetratingly provided substantially between the spindle motor fixing recessed groove of the deck and the guide shaft, the vibration which is transmitted from the guide shaft side to the disk through the spindle motor fixed to the deck and the turntable can be virtually off and substantially damped. Thus, the disturbance of the focus servo characteristic can be further reduced in the normal working range of the focusing coil.

According to the fifth aspect of the invention, since the vibration damping hole on the guide shaft side is formed with substantially the same width as the vibration damping hole on the guide rail side and is formed in such a manner as to extend from the vicinity of the front end of the guide shaft in the forward direction, a connecting portion between the guide shaft and the deck can be made short. Hence, it becomes possible to substantially damp the vibration transmitted from the guide shaft to the deck.

According to the sixth aspect of the invention, since the reinforcing girder traversing a substantially central portion of the vibration damping hole on the guide shaft side is formed integrally with the deck, it is possible to prevent the deck from becoming deflected due to the weight of the spindle motor and reliably fix the spindle motor to the deck.

BRIEF DESCRIPTION OF THE DRAWINGS

These and other objects and advantages of this invention will become more fully apparent from the following detailed description taken with the accompanying drawings in which:

FIG. 10 is an explanatory diagram illustrating the vibration acceleration of a central portion of a disk.

DETAILED DESCRIPTION OF THE PREFERRED EMBODIMENTS

Figure 1:
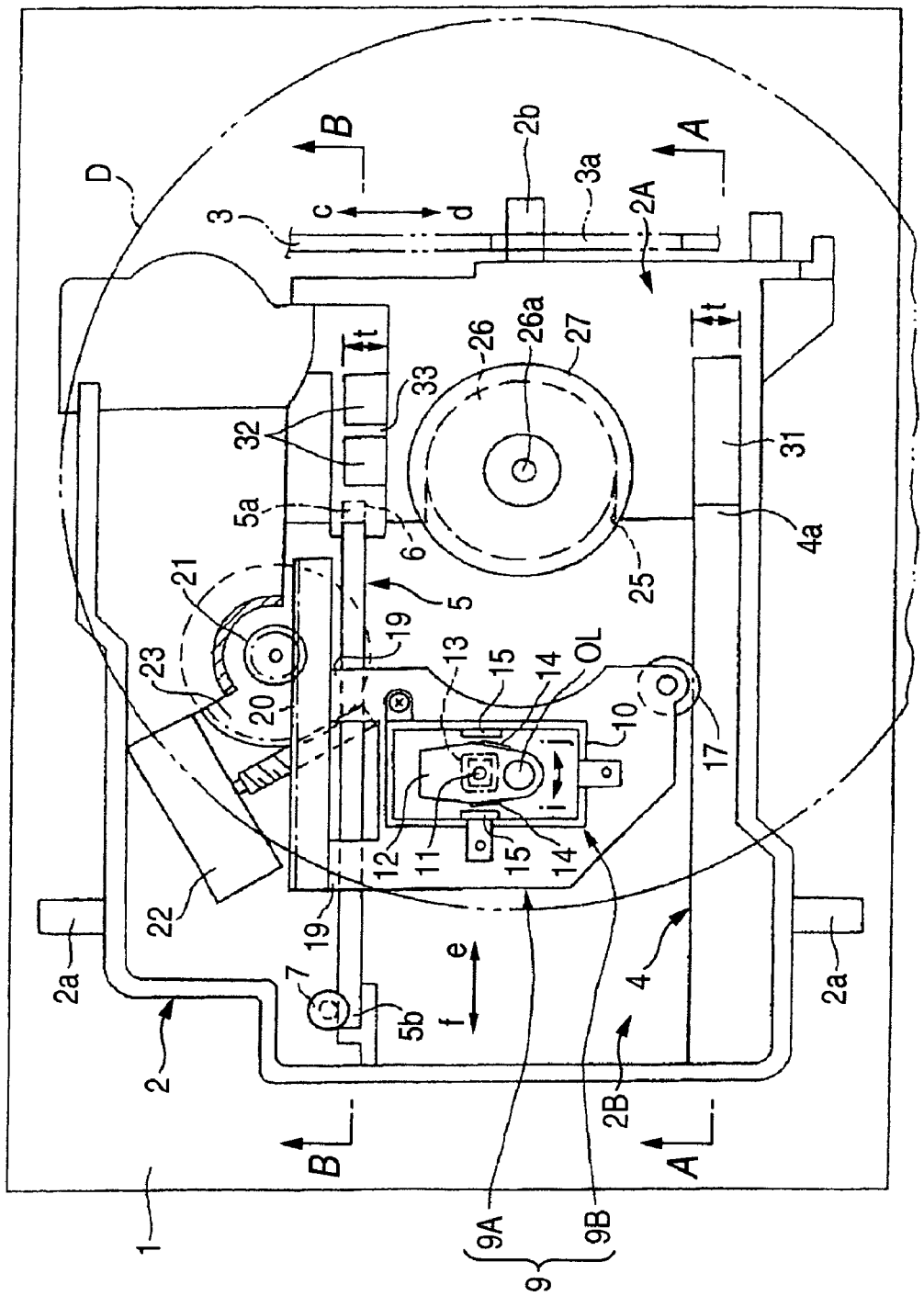
FIG. 1 is a schematic plan view of a disk player in accordance with an embodiment of the invention.
Figure 2:
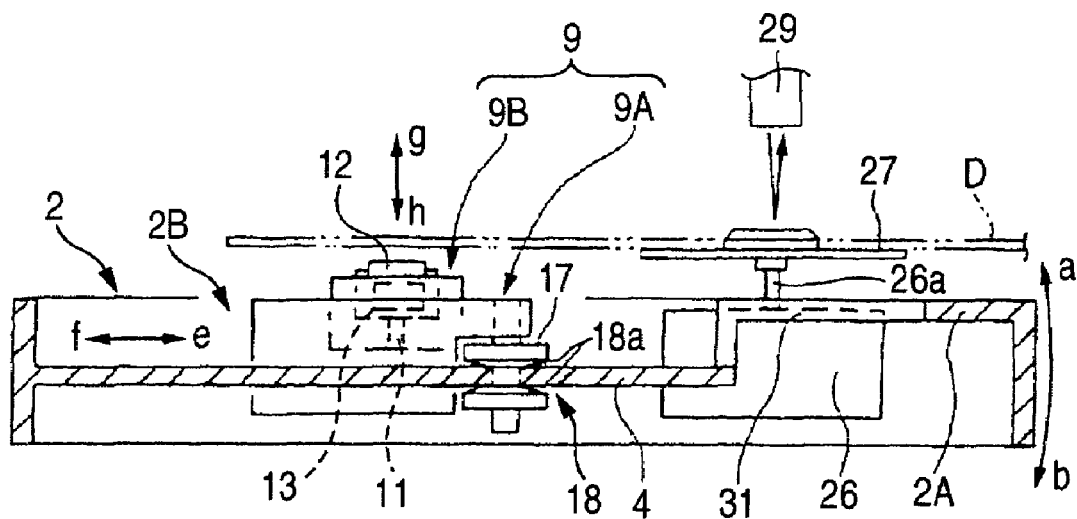
FIG. 2 is a view taken along the direction of arrows A-B of FIG. 1.
Figure 3:
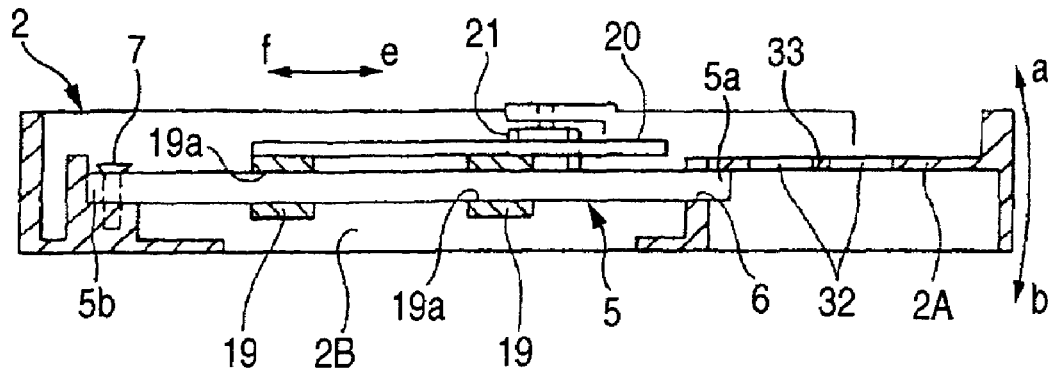
FIG. 3 is a view taken along the direction of arrows B-A of FIG. 1.
Figure 4:
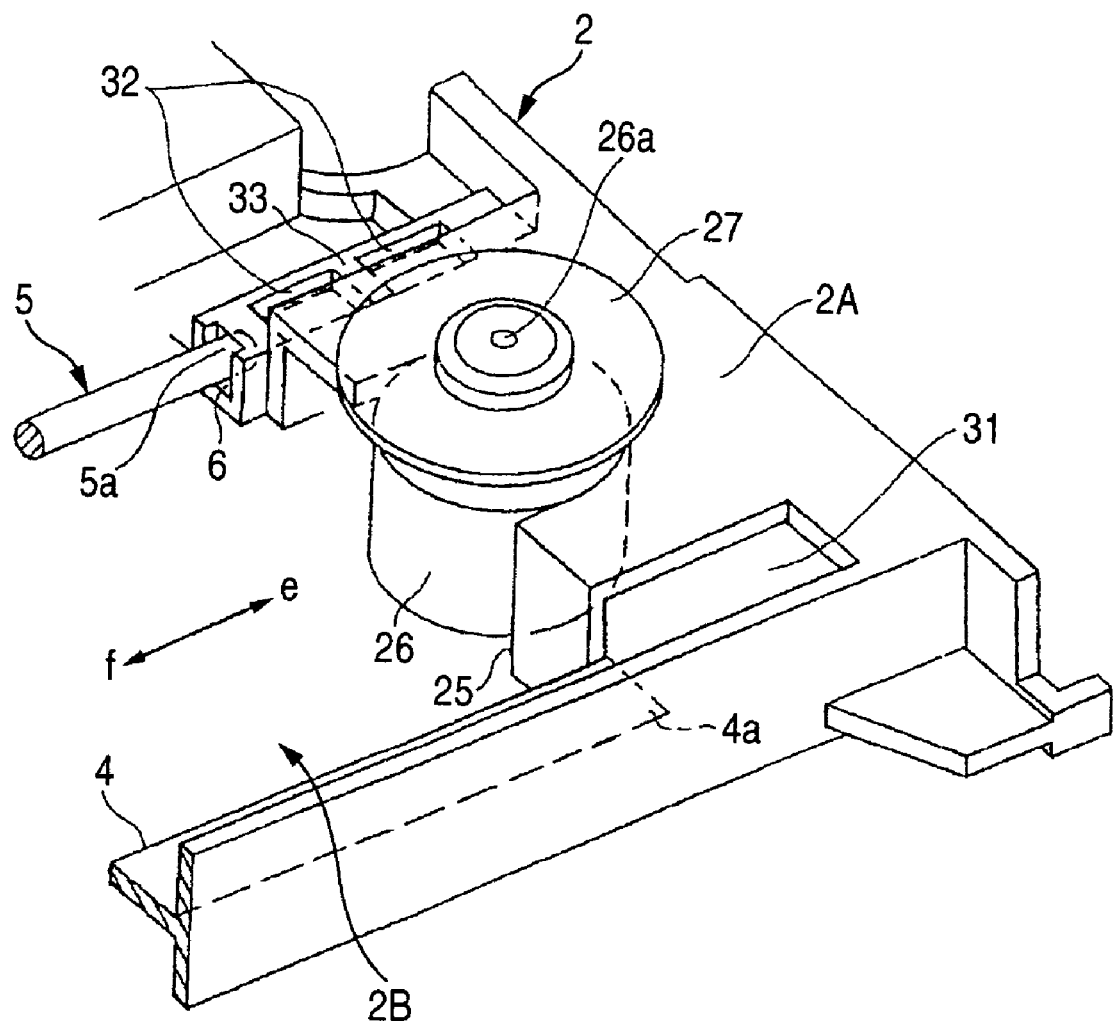
FIG. 4 is a perspective view of essential portions thereof.
Figure 5:
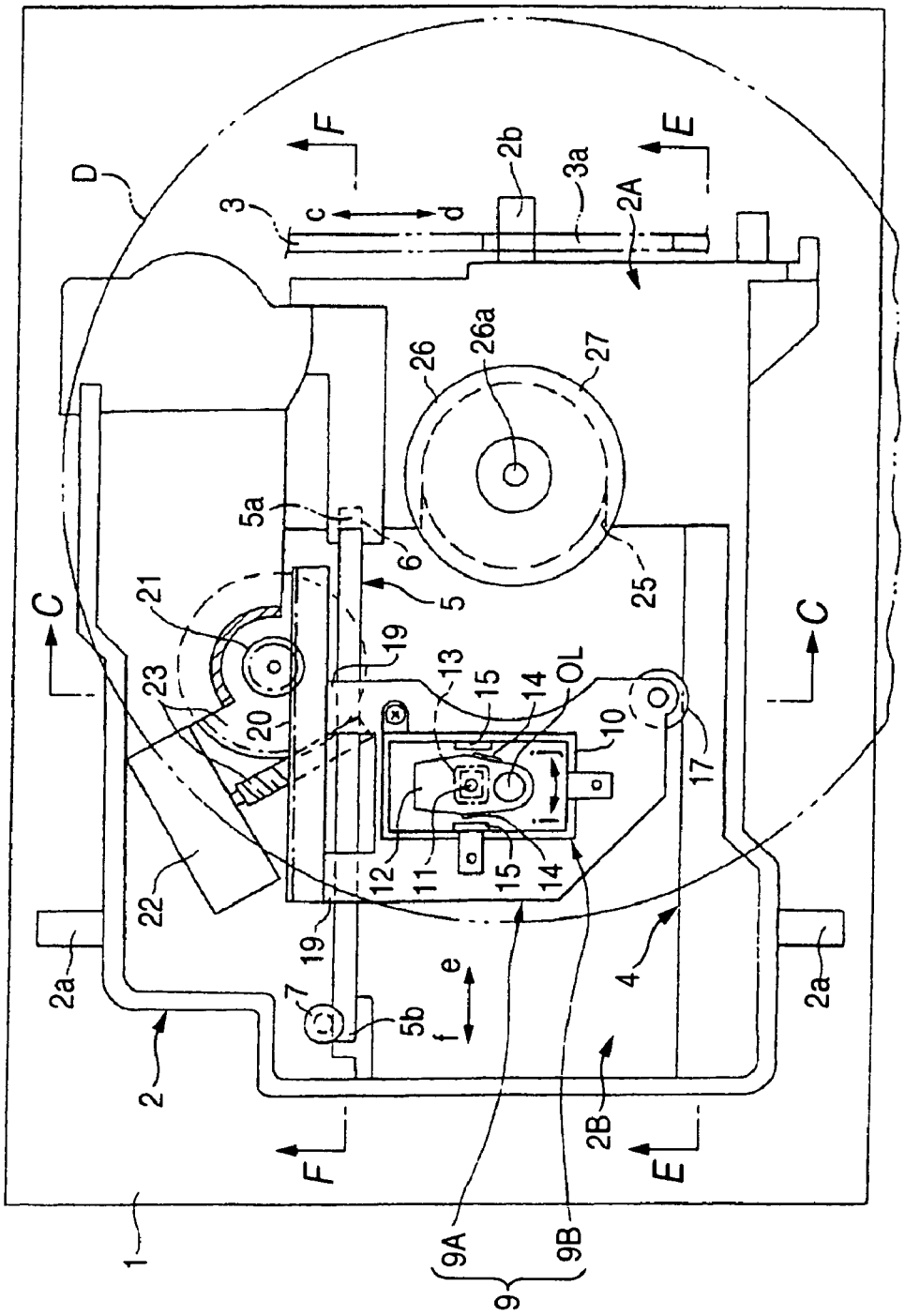
FIG. 5 is a schematic plan view illustrating a conventional example.
Figure 6:
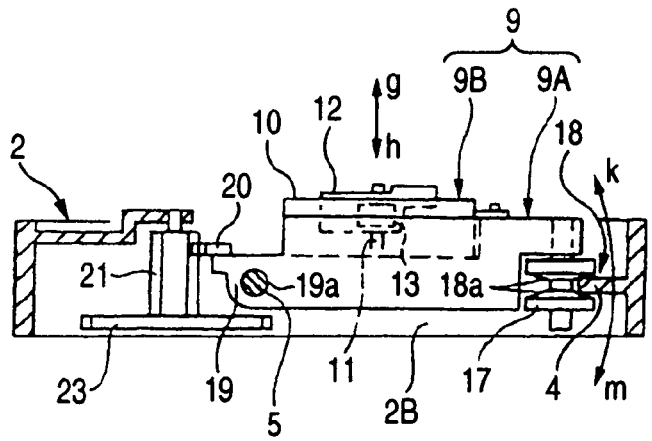
FIG. 6 is a view taken along the direction of arrows C-C of FIG. 5.
Figure 7:
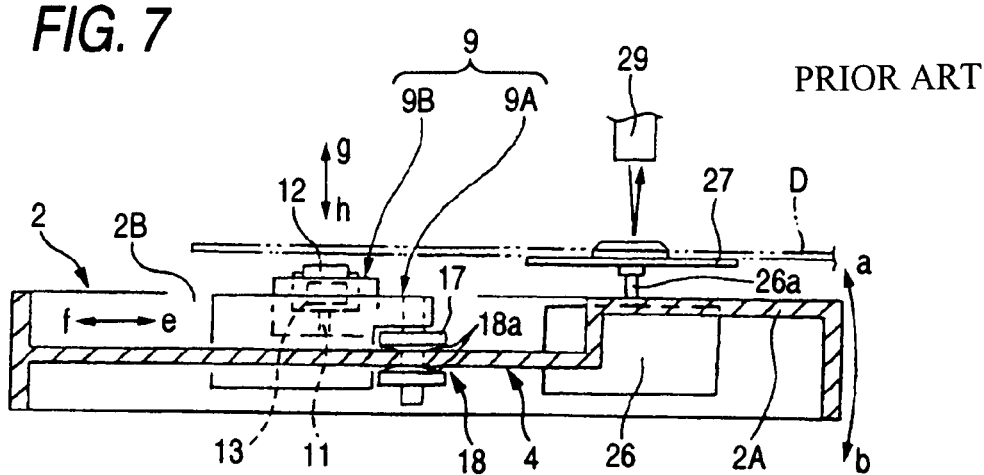
FIG. 7 is a view taken along the direction of arrows D-D of FIG. 5.

FIGS. 1 to 4 show a disk player in accordance with an embodiment of the invention. Vibration damping holes 31 and 32 are respectively provided penetratingly in a deck 2A substantially between a spindle motor fixing recessed groove 25 of the deck 2A and a guide rail 4 and between the recessed groove 25 and a guide shaft 5. The vibration damping hole 31 is formed in such a manner as to extend from a front end 4a of the guide rail 4 in a forward direction e with the same width t as the guide rail 4. Meanwhile, the vibration damping hole 32 is formed in such a manner as to extend from the vicinity of a front end 5a of the guide shaft 5 in the forward direction e with substantially the same width t as the vibration damping hole 31. A reinforcing girder 33 traversing a substantially central portion of the vibration damping hole 32 on the guide shaft side is formed integrally with the deck 2A. Since arrangements other than those described above are substantially identical to those shown in FIGS. 5 to 9, identical portions will be denoted by the same reference numerals, and a description thereof will be omitted.

According to the above-described construction, as a lens holder 12 is moved in focusing directions g and h by exciting a focusing coil 13, an optical pick up 9 is vibrated in upward and downward directions k and m (see FIG. 6) about the guide shaft 5. Even if the vibration is transmitted from the guide rail 4 and the guide shaft 5 to the deck 2A, the vibration is virtually off since the vibration damping holes 31 and 32 provided penetratingly in the deck 2A are provided in routes respectively extending from the guide rail 4 and the guide shaft 5 to a spindle motor 26. Therefore, the vibration transmitted to a disk D through the spindle motor 26 fixed to the deck 2A and a turntable 27 is substantially reduced.

Figure 8:
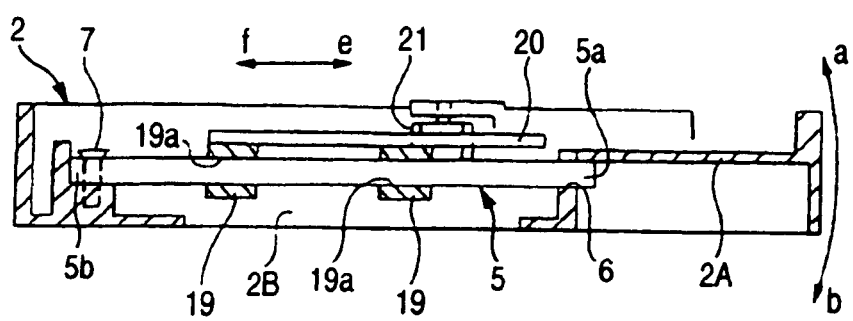
FIG. 8 is a view taken along the direction of arrows E-E of FIG. 5.
Figure 9:
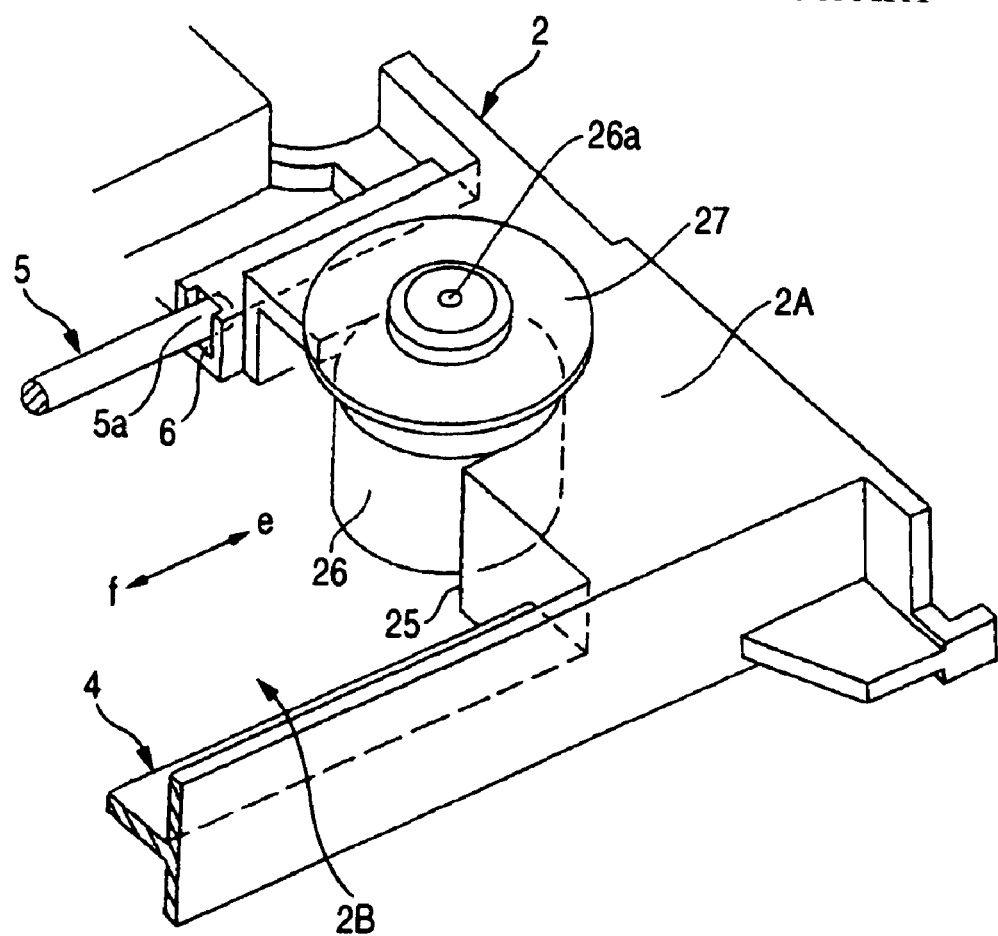
FIG. 9 is a perspective view of essential portions thereof.

As shown in FIG. 8, when the present inventor examined the infinitesimal vibration (vibration acceleration) of a central portion of the disk D by an acceleration pickup 29, the infinitesimal vibration was as shown at a solid line H in FIG. 10. It was found that the disturbance of the focus servo characteristic was reduced in a normal working range α (1,300 to 2,100 Hz) of the focusing coil 13. As a result, it becomes possible to speedily effect the focusing of the objective lens OL with respect to the disk D and substantially reduce the reading speed as compared with the conventional arrangement.

Here, in particular, since the vibration damping hole 31 on the guide rail side has the same width t as the guide rail 4 and is formed in such a manner as to extend from the front end 4a of the guide rail 4 in the forward direction, a connecting portion between the guide rail 4 and the deck 2A can be made short. Hence, it becomes possible to substantially damp the vibration transmitted from the guide rail 4 to the deck 2A.

Further, since the vibration damping hole 32 on the guide shaft side is formed with substantially the same width t as the vibration damping hole 31 on the guide rail side and is formed in such a manner as to extend from the vicinity of the front end 5a of the guide shaft 5 in the forward direction, a connecting portion between the guide shaft 5 and the deck 2A can be made short. Hence, it also becomes possible to substantially damp the vibration transmitted from the guide shaft 5 to the deck 2A.

Further, since the vibration damping hole 31 and the vibration damping hole 32 are respectively provided penetratingly in the deck substantially between the spindle motor fixing recessed groove 25 of the deck and the guide rail 4 and between the spindle motor fixing recessed groove 25 and the guide shaft 5, a rigidity of the deck 2A, the guide rail 4 and the guide shaft 5 decreases, and a frequency of a infinitesimal vibration (vibration acceleration) of the central portion of the disk D sifts to a low frequency domain. Therefore, in the present invention, a disturbance of the focus servo characteristic in a normal working range α (1,300 to 2,100 Hz) of the focusing coil 13 becomes smaller than that of the disk player shown in FIGS. 5 to 9.

Furthermore, since the reinforcing girder 33 traversing a substantially central portion of the vibration damping hole 32 on the guide shaft side is formed integrally with the deck 2A, it is possible to prevent the deck 2A from becoming deflected due to the weight of the spindle motor 26 and reliably fix the spindle motor 26 to the deck 2A.

What is claimed is:

1. A disk player in which a synthetic resin-made drive chassis is disposed in a housing in such a manner as to be vertically movable, a deck is integrally formed on a front side of the drive chassis, an accommodating recess is formed in the drive chassis rearwardly of the deck, one side edge of the accommodating recess is formed as a guide rail extending from a rear end portion of the drive chassis toward the deck in backward and forward directions, both ends of a guide shaft disposed on another side edge side of the accommodating recess in parallel with the guide rail are fixed to the rear end portion of the drive chassis and the deck, an optical pick up including a synthetic resin-made base and a lens holder with an objective lens which is movable in a focusing direction and a tracking direction by fitting to a supporting shaft provided uprightly on the base is disposed in the accommodating recess, a pair of outwardly expanding and inclined inner side surfaces of an annular guide groove, which is formed in an outer peripheral surface of a guide roller pivotally secured to one end portion of the base, are engaged with the guide rail, the guide shaft is fitted in a bearing hole of a bearing portion integrally provided projectingly on another end portion of the base, a recessed groove communicating with the accommodating recess is formed in the deck, a spindle motor is fixed in the recessed groove, a turntable for mounting a disk is secured to a rotating shaft of the spindle motor, as the drive chassis is moved upward, a disk is mounted on the turntable, the disk is rotated at high speed by the spindle motor, the optical pick up is reciprocatingly moved along the guide rail and the guide shaft, the lens holder is moved in the focusing direction and the tracking direction, laser light is projected onto the disk through the objective lens so as to read information recorded on the disk, a first vibration damping hole is provided penetratingly in the deck substantially between the recessed groove and the guide rail and a second vibration damping hole is provided penetratingly in the deck substantially between the recessed groove and the guide shaft, the first vibration damping hole has the same width as the guide rail and is formed in such a manner as to extend from a front end of the guide rail in the forward direction, the second vibration damping hole is formed with substantially the same width as the first vibration damping hole and is formed in such a manner as to extend from a vicinity of a front end of the guide shaft in the forward direction, and a reinforcing girder traverses a substantially central portion of the second vibration damping hole and is formed integrally with the deck.

2. A disk player comprising:
a drive chassis synthetic made of synthetic resin;
a deck integrally formed on a front side of the drive chassis and formed with a groove;
an accommodating recess formed in the drive chassis in a rear side of the deck and communicating with the groove;
a guide rail formed on a first side edge of the accommodating recess, the guide rail extending from a rear end portion of the drive chassis toward the deck and having a first width;
a guide shaft disposed on a second side edge of the accommodating recess in parallel with the guide rail, the guide shaft being fixed to the rear end portion of the drive chassis and the deck;
a recessed groove communicating with the accommodating recess, the recessed groove formed in the deck,
a spindle motor fixed in the groove having a rotating shaft;
a turntable secured to the rotating shaft and adapted to support a disk medium;
an optical pick up disposed in the accommodating recess, the optical pick up including a base made of synthetic resin, and a lens holder fitted with the supporting shaft and holding an objective lens so as to be movable in a focusing direction and tracking direction with respect to the disk medium; and
a first hole penetrating the deck at a part between the groove and the guide rail, the first hole having the first width and extending from a front end of the guide rail.

3. A disk player comprising:
a drive chassis synthetic made of synthetic resin;
a deck integrally formed on a front side of the drive chassis and formed with a groove;
an accommodating recess formed in the drive chassis in a rear side of the deck and communicating with the groove;
a guide rail formed on a first side edge of the accommodating recess, the guide rail extending from a rear end portion of the drive chassis toward the deck and having a first width;
a guide shaft disposed on a second side edge of the accommodating recess in parallel with the guide rail, the guide shaft being fixed to the rear end portion of the drive chassis and the desk;
a recessed groove communicating with the accommodating recess, the recessed groove formed in the deck,
a spindle motor fixed in the groove having a rotating shaft;
a turntable secured to the rotating shaft and adapted to support a disk medium;
an optical pick up disposed in the accommodating recess, the optical pick up including a base made of synthetic resin, and a lens holder fitted with the supporting shaft and holding an objective lens so as to be movable in a focusing direction and tracking direction with respect to the disk medium;
a first hole penetrating the deck at a part between the groove and the guild rail; and
a second hole penetrating the deck at a part between the recessed groove and the guide shaft, the second hole having the first width and extending from a part adjacent to a front end of the guide shaft.

4. The disk player according to claim 3, wherein the second hole is formed with substantially the same width as the first hole and is formed in such a manner as to extend from a vicinity of a front end of the guide shaft in the forward direction.

5. The disk player according to claim 4, wherein a reinforcing girder traverses a substantially central portion of the second hole and is formed integrally with the deck.

* * * * *